United States Patent
Schäfer et al.

(10) Patent No.: US 12,521,878 B2
(45) Date of Patent: Jan. 13, 2026

(54) COMPENSATING UNIT FOR AN AUTOMATION SYSTEM

(71) Applicant: SCHUNK GmbH & Co. KG Spann- und Greiftechnik, Lauffen am Neckar (DE)

(72) Inventors: Marco Schäfer, Untergruppenbach (DE); Florian Piper, Heilbronn (DE); Christian Friedrich, Gundelsheim (DE)

(73) Assignee: SCHUNK GmbH &Co. KG Spann—und Greiftechnik, Lauffen am Neckar (DE)

( * ) Notice: Subject to any disclaimer, the term of this patent is extended or adjusted under 35 U.S.C. 154(b) by 489 days.

(21) Appl. No.: 17/771,676

(22) PCT Filed: Oct. 22, 2020

(86) PCT No.: PCT/EP2020/079716
§ 371 (c)(1),
(2) Date: Apr. 25, 2022

(87) PCT Pub. No.: WO2021/078840
PCT Pub. Date: Apr. 29, 2021

(65) Prior Publication Data
US 2022/0388166 A1    Dec. 8, 2022

(30) Foreign Application Priority Data

Oct. 25, 2019   (DE) .................. 10 2019 128 931.9

(51) Int. Cl.
B25J 9/16    (2006.01)
B25J 17/02   (2006.01)
(Continued)

(52) U.S. Cl.
CPC ......... *B25J 9/1641* (2013.01); *B25J 17/0208* (2013.01); *F16H 19/04* (2013.01); *F16D 2125/24* (2013.01)

(58) Field of Classification Search
CPC .. F16D 2125/24; F16H 19/04; B25J 17/0208; B25J 9/1641
See application file for complete search history.

(56) References Cited

U.S. PATENT DOCUMENTS 4,714,865 A   12/1987 Chin et al.
4,717,003 A   1/1988 McCormick et al.
(Continued)

FOREIGN PATENT DOCUMENTS

DE   252512 A3    12/1987
DE   3620391 A1   12/1987
(Continued)

OTHER PUBLICATIONS

Machine translation. (Year: 2004).*
(Continued)

*Primary Examiner* — Randell J Krug
(74) *Attorney, Agent, or Firm* — BOND, SCHOENECK & KING, PLLC; George R. McGuire

(57) ABSTRACT

Compensating unit for an automation system, in particular for arranging between a handling apparatus and a tool, having a main part and having a fastening part, wherein the fastening part is arranged such that it can be moved in relation to the main part along at least one compensating direction from a basic position into a compensating position, and having spring means for returning the fastening part from the compensating position into the basic position, characterized in that drive means are provided within the (Continued)

compensating unit for the purpose of adjusting the basic position of the fastening part along the at least one compensating direction.

15 Claims, 10 Drawing Sheets

(51) Int. Cl.
*F16H 19/04* (2006.01)
*F16D 125/24* (2012.01)

(56) References Cited

U.S. PATENT DOCUMENTS

| | | | |
|---|---|---|---|
| 4,801,240 A * | 1/1989 | Hautau | B25J 17/0208 901/45 |
| 5,448,146 A | 9/1995 | Erlbacher | |
| 5,509,848 A | 4/1996 | Shimbara | |
| 2013/0118287 A1 | 5/2013 | Holgate | |

FOREIGN PATENT DOCUMENTS

| | | |
|---|---|---|
| DE | 29607680 U1 | 6/1996 |
| DE | 19620195 C1 | 11/1997 |
| DE | 102011109786 A1 | 2/2013 |
| DE | 202012012857 U1 | 2/2014 |
| EP | 1740353 A1 | 1/2007 |
| EP | 2065144 A1 | 6/2009 |
| GB | 2168029 A | 6/1986 |
| JP | H04315205 A | 11/1992 |
| JP | 2004066364 A * | 3/2004 |
| KR | 20120045816 A * | 5/2012 |

OTHER PUBLICATIONS

Machine translation. (Year: 2012).*
English Translation of International Preliminary Report on Patentability, dated Feb. 14, 2022. pp. 1-7.
International Search Report and Written Opinion for PCT/EP2020/079716, mailing date of search report, Jan. 29, 2021. pp. 1-8.
GPTO Examination Report, pp. 1-4.

* cited by examiner

COMPENSATING UNIT FOR AN AUTOMATION SYSTEM

BACKGROUND

This is a National Stage Application filed under 35 U.S.C. 371 based on International Patent Application No. PCT/EP2020/079716, filed on Oct. 22, 2020, which claims priority to German Patent Application 10 2019 128 931.9, filed Oct. 25, 2019. The entire disclosures of each of the foregoing are hereby incorporated herein by reference in their entireties.

The invention relates to a compensating unit for an automation system, in particular for arranging between a handling apparatus and a tool, having a main part and having a fastening part, the fastening part being arranged such that it can be moved in relation to the main part along at least one compensating direction from a basic position into a compensating position, and having spring means for returning the fastening part from the compensating position into the basic position. The main part can be designed to be fastened to a handling apparatus or a tool and the fastening part can be designed to be fastened to a tool or a handling apparatus.

Compensating units, which are also referred to as overload protection devices, are known from the prior art and are used in particular for externally powered handling apparatuses, for example in axis-controlled or path-controlled industrial robots, to avoid damage in the event of collisions between the tool and objects in the vicinity of the handling apparatus. For this purpose, the compensating unit has the main part for being arranged in particular on the handling apparatus, for example on a receiving flange of a robot arm. The fastening part, for example in the form of a tool flange, is provided on the main part, which flange is designed in particular for receiving handling tools, for example gripping devices, machining devices or measuring devices. The fastening part is movably connected to the main part so that a relative movement or compensating movement between the main part and the fastening part is made possible. In this case, linear and/or rotary compensating movements can be provided depending on the region of application of the handling tools attached to the tool holder. The compensating movement is usually limited by the structural conditions of the main part and the fastening part attached thereto. In order to prevent undesired compensating movements, spring means are provided which apply a preloading force between the main part and the fastening part so that a compensating movement can only take place when the preloading force is overcome. Thus, in the event of a collision, in particular between the handling tool and an object, initially only a collision force determined by the magnitude of the preloading force occurs. Since it may not be possible to rule out the possibility that an available range of movement for the compensating movement is sufficient to completely absorb the movement performed by the handling apparatus, a switching device can be provided between the main part and the fastening part, which switching device generates a switching signal when the fastening part is deflected to the maximum relative to the main part, which switching signal can be forwarded to a control device in order to stop the movements of the handling apparatus and optionally displace said apparatus in the opposite direction.

The applicant's XYZ AGE-S compensating unit, which is shown in current catalog materials, is a known embodiment of a compensating unit for carrying out a compensating movement in the three spatial directions. The fastening part of the AGE-S has two movable planes, with one of the planes being able to be displaced in the x-direction and the other plane being able to be displaced in the y-direction in order to make it possible to compensate for the fastening part in the x-direction and y-direction from the basic position into the respective compensating position. Furthermore, compensation in the third spatial direction, in the z-direction, is possible.

A compensating unit which provides spring elements for generating a preloading force is known from U.S. Pat. No. 4,717,003. The distance between the housing and a tool plate is determined by sensors. If a predetermined distance is exceeded, a signal is output.

An adapter which has collision protection and provides a main housing is known from DD 252 512 A3. A pressure volume which is sealed by means of a membrane is arranged in the main housing. A signal is output by a sensor when a flange is lifted from the locking means.

JP H04 315205 A discloses a handling device having a measuring device for determining the load, the acceleration of the handling device being selected on the basis of the load.

A system for surface machining having a tool and having a pneumatic cylinder, in which a constant force is applied to a workpiece by unevenness in the workpiece surface being compensated for by the pneumatic cylinder, is known from U.S. Pat. Nos. 5,509,848 A and 5,448,146 A.

A positioning device for aligning a pipe to a hole having pneumatically operable drive means is known from D5.

JP 2004 066364 A discloses a passive compensating unit having spring elements and a force measurement system.

Further compensating units are known, for example, from EP 1 740 353 A1, DE 20 2012 012 857 U1 or U.S. Pat. No. 4,714,865.

SUMMARY OF THE INVENTION

The problem addressed by the present invention is that of developing a known compensating unit in an advantageous manner.

This problem is solved by way of a compensating unit having the features of claim 1. Such a compensating unit can be referred to as an active compensating unit and thus drive means for the purpose of adjusting the basic position of the fastening part along the at least one compensating direction, and preferably along at least two or three compensating directions, in particular in the x-direction, y-direction and z-direction, are provided in the compensating unit. It is also conceivable that, additionally or alternatively, the basic position can be adjusted by means of the drive means along one or more circular paths which are arranged perpendicularly to the x-direction, y-direction and/or z-direction.

Due to the adjustability of the basic position, an undesired collision and associated swerving of the fastening part can be minimized, and advantageously completely avoided, in particular when the same components are repeatedly handled, by means of a corresponding adjustment of the basic position. Overall, this leads to lesser forces acting on the handling unit and thus to less wear.

If, for example, the actual position or shape of an object to be gripped or to be machined deviates from the path of the handling apparatus specified by the automation system, and thus from the compensating unit including the main part, this deviation, provided it is within the maximum possible compensating position, can be corrected when a corresponding object is gripped or machined again at the location of the deviation by adjusting the basic position of the fastening part in the respective compensating direction. The required compensation is preferably provided exclusively by the compensating unit and not via modified control of the handling apparatus to achieve a modified path of the handling apparatus. The path of the tool or the fastening part is preferably modified in the region of the deviation by the compensating unit. The path of the handling apparatus or of the main part arranged thereon preferably remains unmodified. Consequently, the path of the handling apparatus or the main part arranged thereon can continue to extend as specified, whereas the path of the tool or the fastening part deviates therefrom and corresponds to the shape of the object to be processed. An intervention in the machine control of the automation system or the handling apparatus is not required to correct the deviation. A modification in the path of the handling apparatus to compensate for the deviation would also be conceivable, but this results in poor dynamic properties and is associated with a high degree of flexibility in the overall system.

A control unit is advantageously provided, by means of which the drive means can be controlled. The control unit is preferably designed in such a way that it controls the drive means on the basis of the forces and/or moments acting on the compensating unit. The control unit is preferably provided within the compensating unit. Adjusting the basic position on the basis of the forces and/or moments acting on the compensating unit allows active force regulation and active setting of the damping capability, the rigidity and/or the inertia. If it is determined that the forces and/or moments acting on the compensating unit are too high and exceed a threshold value, for example due to a deviation of the object to be machined, then the drive means can be accordingly controlled immediately and/or in real time, i.e., during machining at the deviation of the object, so that the basic position is still shifted at the location of the deviation in order to avoid overloading and, in particular, damage. Consequently, when a deviation is first contacted, the resulting change in force can preferably be compensated for or the desired target force can be set. Overall, there is closed-loop control which, due to the active control of the drive means, leads to lesser forces acting on the compensating unit overall and thus also to low-wear and long-lasting operation of the entire automation system.

It is advantageous if the control unit is further set up in such a way that it determines the forces and/or moments acting on the compensating unit on the basis of the positional deviation of the compensating position from the basic position in the case of a known spring rate of the spring means. This can be done in particular in such a way that the fastening part is shifted in the x-direction, y-direction and z-direction into a target position which corresponds to the basic position by controlling the drive means. The actual position is then determined in the x-direction, y-direction and z-direction. If external forces now act on the fastening part, then the spring means are compressed in the direction in which the force acts, with the result that the basic position (desired position) deviates from the compensating position (actual position) by a value $\Delta L$. If the spring rate c of the spring means is known, the force $F_{x,y,z}$ acting on the fastening part in the x-direction, y-direction and z-direction can be determined as follows using Hooke's law:

$$F_{x,y,z} = c \cdot \Delta L_{x,y,z}$$

This allows position changes at the tool center point as well as forces and/or moments in the entire SE(3) (Special Euclidean Group) to be determined and corrected.

The control unit can also be set up to control the entire automation system or the handling apparatus and the tool.

Furthermore, the fastening part is preferably arranged such that it can be moved by means of activating the drive means into a along an x-direction extending perpendicularly to the longitudinal axis of the fastening part and along a y-direction extending perpendicularly to the longitudinal axis of the fastening part and perpendicularly to the x-direction. The fastening part can then be shifted by corresponding activation of the drive means in the two compensating directions in the x-direction and y-direction or in a displacement plane spanned by these two directions. It is also possible for the fastening part to be arranged opposite the main part and for the drive means to be designed in such a way that they can also move the fastening part in the direction of the longitudinal axis of the fastening part, i.e., in the z-direction. In particular, the compensating unit can be of modular design so that individual modules can be mapped for compensating in the x-direction, compensating in the y-direction and/or compensating in the z-direction. It is also conceivable that the fastening part is arranged so that it can be moved along one or more circular paths by activating the drive means, the circular paths extending perpendicularly to the x-direction, y-direction and/or z-direction.

The fastening part preferably has a first plane which is arranged such that it is guided in the x-direction on the main part and can be moved along the x-direction when a first drive means is activated. Furthermore, the fastening part preferably has a second plane which is arranged such that it is guided in the y-direction on the first plane and can be moved along the y-direction when a second drive means is activated. The design is advantageous in that the handling tool can be arranged on the second plane. Such a configuration has the advantage that, in the event of a collision, the fastening part or the second plane can be shifted in the x-direction and y-direction against the spring force of the spring means from the basic position into the compensating position. Furthermore, such a configuration has the advantage that by activating the respective drive means, the basic position of the fastening part can be adjusted in a displacement plane spanned by the x-direction and y-direction. In this case, the two planes can be shifted in the z-direction by means of a third drive means. Since the drive means can preferably be controlled independently of one another, a superimposed movement of the fastening part can take place in the x-direction and y-direction.

The main part advantageously has an x-axis guide for guiding the first plane in the x-direction, and the first plane has a y-axis guide for guiding the second plane in the y-direction. As a result, the second plane can ultimately be shifted in a simple manner, guided in the x-direction and y-direction.

In a further embodiment, the first and/or the second drive means each have a drive and a positioning element which can be shifted in the x-direction or y-direction by means of the respective drive. An adapter coupled to the respective plane for displacing the respective plane in the x-direction or y-direction is provided on the respective positioning element in each case, the respective adapter being arranged such that it is movably guided in the x-direction or y-direction on the respective positioning element and being arranged such that it is preloaded in the respective basic position by means of the spring means. The axially shiftable positioning elements are therefore coupled to the respective adapter via the preloaded spring means in such a way that it is possible for said adapter to swerve into the respective compensating direction against the spring force of the respective spring means. However, if the positioning elements are shifted axially for the purpose of adjusting the respective basic position, then the corresponding plane is also shifted in the respective direction. The two planes can likewise be shifted in the z-direction by means of a third drive.

It is conceivable that the first and/or the second drive is arranged as a rotary drive which has a drive pinion, that the actuator is arranged as a rack which engages with the drive pinion and has a shaft portion, and that the adapter is displaceably arranged on the shaft portion of the rack, the adapter in particular being arranged between two spring elements in such a way that it is pushed into the basic position by the spring elements and can swerve into the compensating position against the spring force of the spring elements. The respective adapter can preferably be arranged displaceably on the respective shaft portion by means of a slide bearing.

The adapter of the first drive is preferably arranged in such a way said adapter is driven by the first drive in the x-direction and is directly movement-coupled to the first plane in the x-direction. The adapter is then preferably designed in one piece as a component that is rigid in terms of movement.

It is also conceivable that the adapter of the second drive has a first adapter part which is guided in the y-direction on the positioning element and has an adapter guide extending in the x-direction, and a second adapter part which is guided so as to be freely movable in the x-direction along the adapter guide, the second adapter part being movement-coupled to the second plane in the y-direction. Such a design means that when the first drive is activated, the second adapter part of the second adapter can also carry out the movement in the x-direction due to the adapter guide on the first adapter part. The adapter of the second drive therefore allows the second adapter part to move in the x-direction. Power transmission when the second drive is activated in the y-direction can nevertheless be guaranteed, since the second adapter part is arranged so that it cannot be moved in the y-direction relative to the first adapter part. If the second drive is consequently activated, the second plane is moved in the y-direction by the second adapter part.

A space-saving arrangement is the result when the positioning element of the first drive and the positioning element of the second drive form an angle of 90°. Furthermore, a space-saving arrangement is the result if the drives are designed as motors, in particular electric motors, the longitudinal axes of the two motors, in particular electric motors, being arranged so as to extend in parallel with one another. It is conceivable that the electric motors each comprise a suitable gear mechanism and/or that an angular gear mechanism, in particular a bevel gear mechanism, is provided between an electric motor and a positioning element.

To fix the fastening part in a specific position, it is advantageous if a controllable locking unit is provided in the main part. The locking unit can preferably act against the second plane in the z-direction and preferably fixes it in a frictional manner, working in particular magnetically or pneumatically.

To adjust the first and second plane in the z-direction, it is conceivable that the two planes are fastened in or on a z-compensating module which has a third drive and by means of which the first and second plane can be shifted in the z-direction.

In order to be able to determine the respective actual positions of the fastening part in the respective compensating direction during operation of the compensating unit, position sensors are preferably provided. It is conceivable that the position sensors work on an optical basis and detect distances between the sensors and reflector elements arranged on the respective planes.

The problem addressed by the invention is likewise solved by an automation system having the features of claim 15. Therefore, the automation system comprises a handling apparatus and a tool, a compensating unit according to the invention being arranged between the tool and the handling apparatus. Such an arrangement of the compensating unit allows the tool to be controlled in an open-loop or closed-loop manner with minimal disturbance variables and short reaction times, in particular due to the good dynamic properties of the system. In this case, the drive means and the control unit for actively regulating the tool are advantageously arranged in the compensating unit.

The tools used can in particular be gripping, grinding or deburring tools. In addition, the compensating unit can be used for assembly (peg-in-hole), position compensation (horizontal, vertical), determining machine loading or quality testing in the form of position or force tolerances.

Furthermore, the problem addressed by the invention is likewise solved by a method for controlling an automation system having the features of claim 15. The tool or the handling apparatus travels along the previously stored trajectory which corresponds to the object to be machined and thereby contacts an unforeseen deviation. Due to the coupling between the tool and the compensating unit, there is a positional deviation from the basic position to the compensating position that can be determined in the compensating unit. The fastening part is advantageously pushed along the compensating direction from the basic position into the compensating position as soon as the actual force acting on the tool or the compensating unit exceeds the spring force of the spring means pushing the fastening part into the basic position. In particular, the aim is for a constant actual force to act on the tool and the compensating unit in order to avoid overloading and, in particular, damage. The positional deviation of the compensating unit, in particular of the fastening part, is detected by means of position sensors. From the positional deviation between the basic position and the compensating position and the known spring constant, the actual force acting on the tool or on the fastening part can be calculated by the control unit. Based on the calculated actual force, the basic position is adjusted by means of the drive means provided in the compensating unit in relation to the target forces specified by the control unit.

The control unit is set up in such a way that the basic position is shifted such that a permissible target force acts on the fastening part or the tool. The target force can be in a predetermined range that is defined on the basis of the handling or machining task. Consequently, the basic position is adapted as soon as an excessive force is detected on the compensating unit so that the active regulation system reacts to an excessive force with a slight delay. In this case, the control unit preferably controls the drive means. The method works accordingly when the force falls below the target force so that a decrease in the actual force acting on the tool can also be readjusted. Additionally or alternatively, the method can be applied on the basis of moments acting on the compensating unit. In this way, active force regulation and active setting of the damping capability, the rigidity and/or the inertia is made possible.

Further details and advantageous embodiments of the invention can be found in the following description, on the basis of which one embodiment of the invention will be described and explained in more detail.

DETAILED DESCRIPTION

Figure 1:
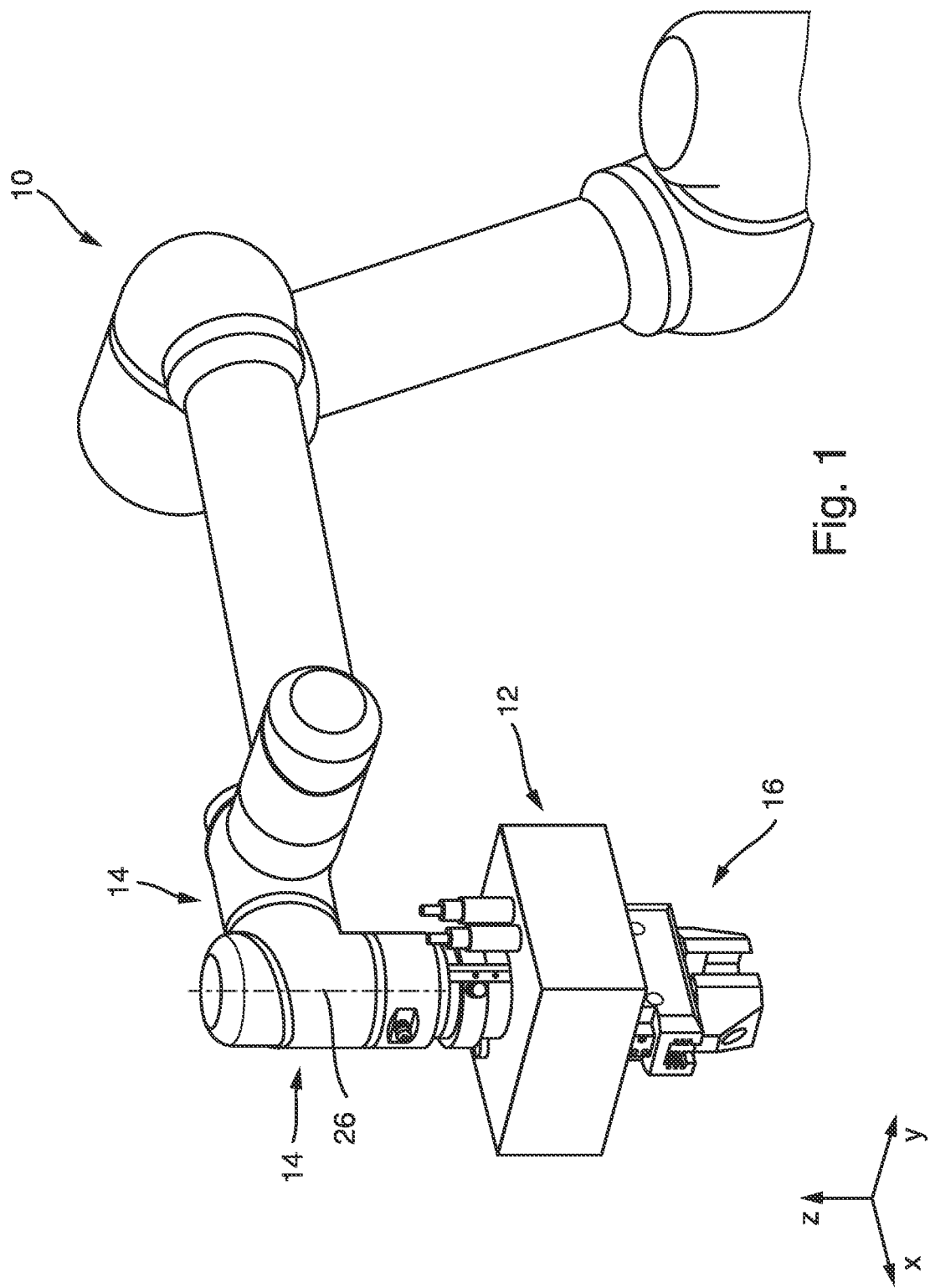
FIG. 1 shows an automation system according to the invention having a compensating unit according to the invention and a tool.
Figure 2:
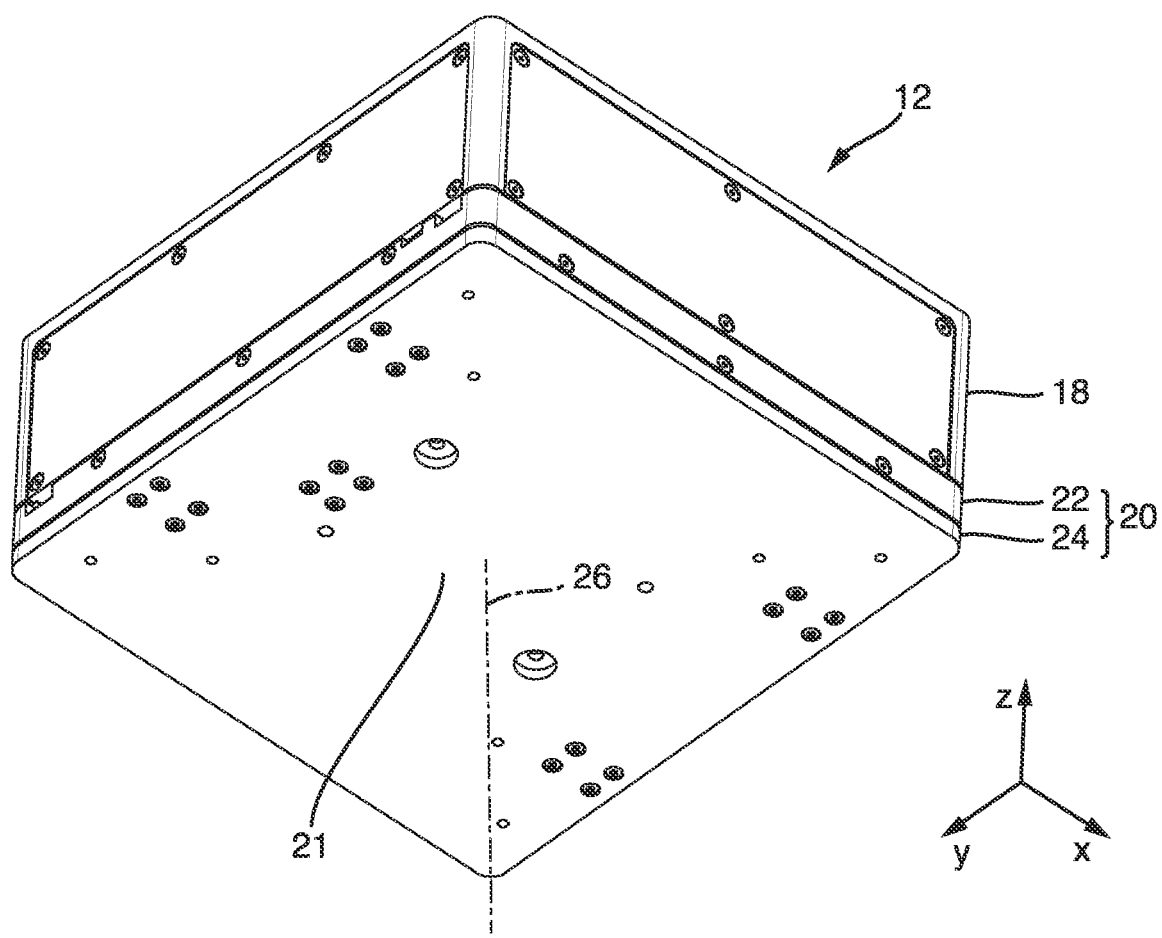
FIG. 2 shows the compensating unit according to FIG. 1 in an inclined view from below.

A compensating unit 12 arranged on an automation system 10 is shown in FIG. 1. The compensating unit 12 is arranged between a handling apparatus in the form of a robot arm 14 and a tool 16 in the form of a gripping device. As is clear from FIG. 2, the underside, i.e., the fastening part 20, of the compensating unit 12 has a fastening portion 21 having fastening holes for fastening the gripping device 16. As is particularly clear from FIG. 3, the compensating unit 12 has a flange portion 17 on its side facing the robot arm 14, which flange portion can be mounted on or fastened to the free end of the robot arm 14. The compensating unit 10, or its main part 18, has a longitudinal axis 26 which extends in the z-direction and, as is clear from FIG. 1, lies in the longitudinal axis 28 of the link of the robot arm 14 to which the main part 18 is attached.

Figure 3:
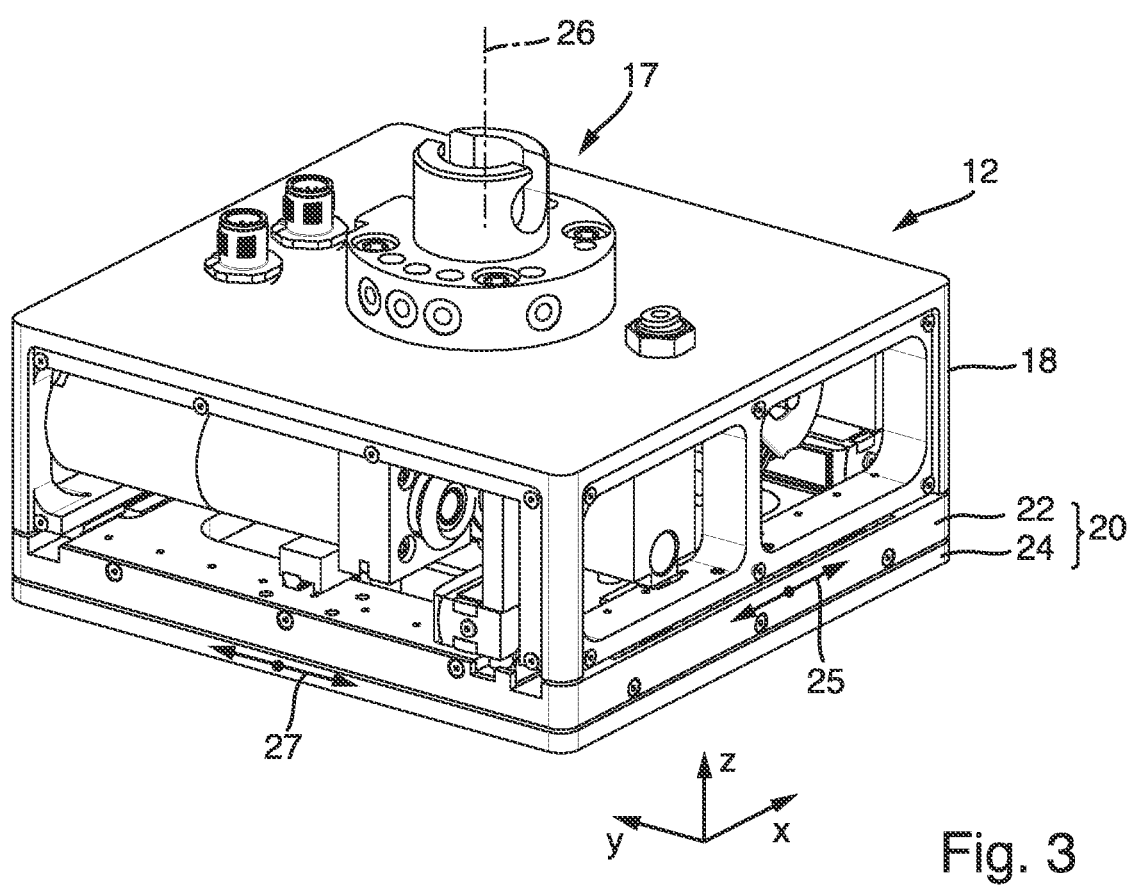
FIG. 3 shows the compensating unit according to FIG. 1 without side panels in an inclined view from above.
Figure 4:
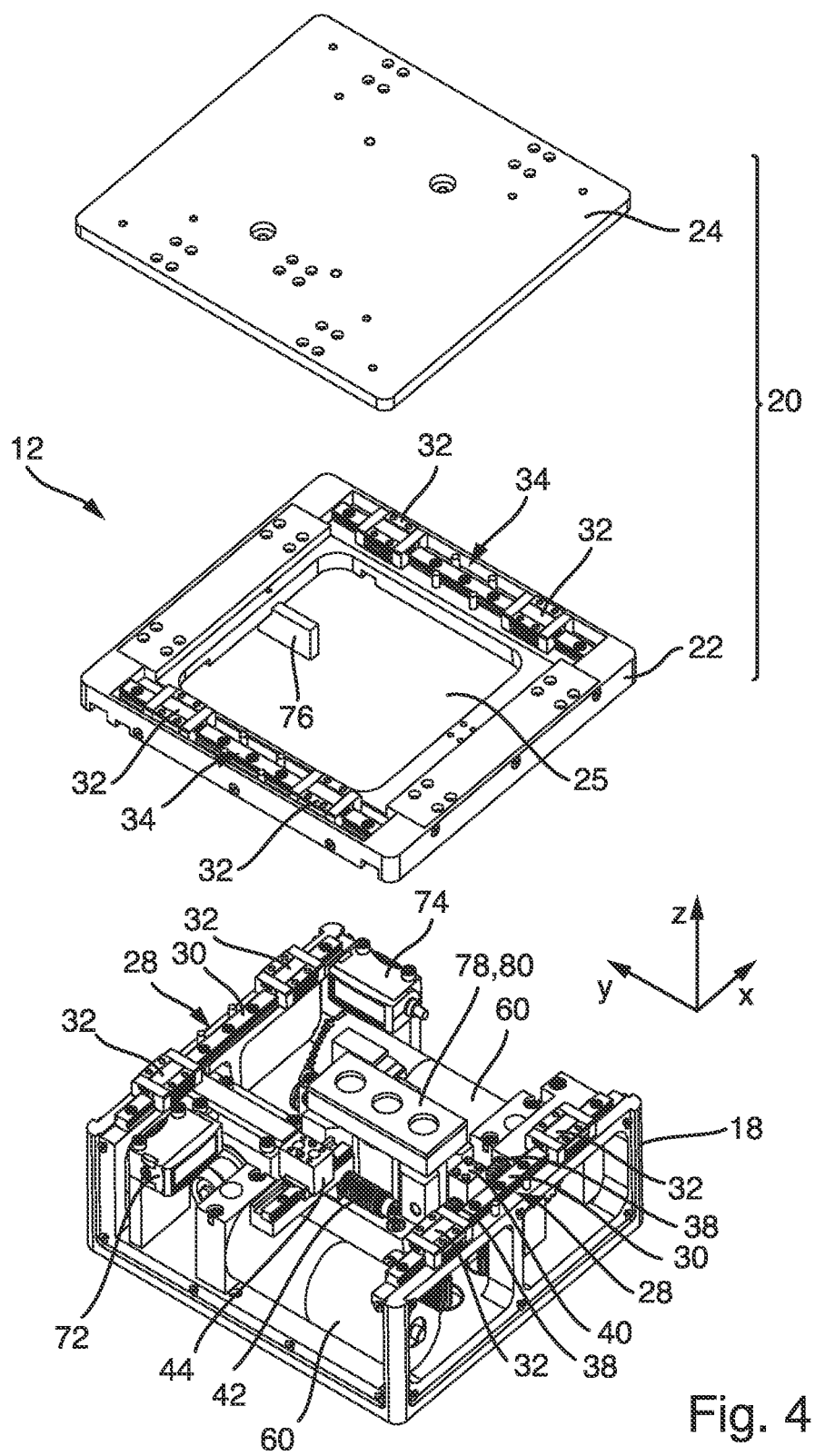
FIG. 4 shows the compensating unit according to FIG. 1 with dismantled planes.

The compensating unit 12 which is shown in more detail in FIGS. 2 to 8 has a main part 18 which can be clearly seen in FIGS. 3 to 4 as well as a fastening part 20 which is movably arranged relative to the main part 18. The fastening part 20 comprises a first plane 22 and a second plane 24. The arrangement of the two planes 22 and 24 is such that the plane 22 is arranged on the main part so that it can be shifted in the x-direction perpendicularly to the z-direction and that the plane 24 is arranged on the second plane 22 so that it can be shifted in the y-direction perpendicularly to the z-direction and the x-direction.

Figure 8:
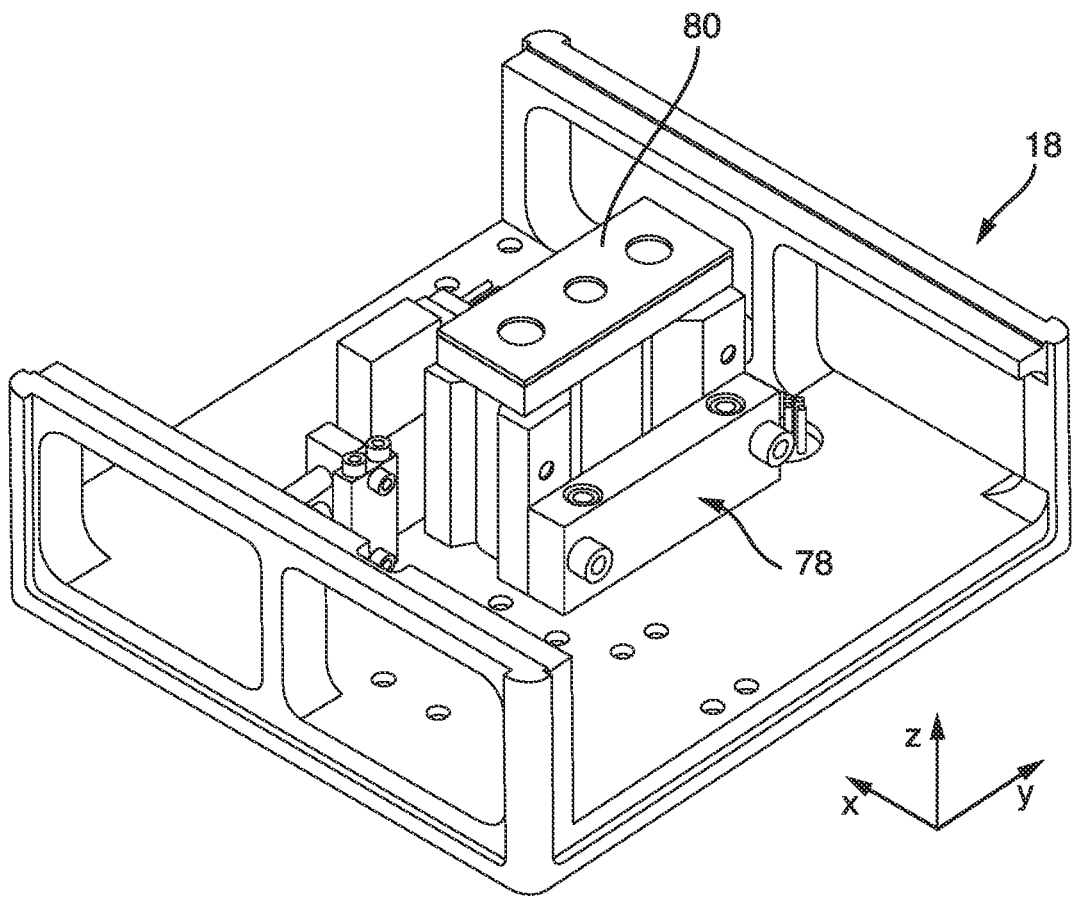
FIG. 8 shows a view according to FIG. 6 without the drive means but having a locking unit.

While the second plane 24 is preferably closed, the first plane 22 has a comparatively large opening 25 in its central region, through which various components which interact with the second plane 24 can engage in the assembled state. These components are, in particular, an adapter 44, which is described below, and a locking unit 80, which is shown in FIG. 8 and is also described below.

As is clear from FIG. 4, an x-axis guide 28 is provided on the main part 18, which x-axis guide supports the first plane 22 so that it can move in the x-direction. The x-axis guide 28 has guide rails 30 arranged on the main part 18 and guide carriages 32 which are displaceably arranged thereon and are firmly fastened to the first plane 22 in the assembled state. To guide the second plane 24 in the y-direction, a y-axis guide 34 is provided on the first plane 22, as is also clear from FIG. 4. The y-axis guide 34 has, like the x-axis guide 28, guide rails 30 but these extend in the y-axis guide 34 and in the y-direction. As shown in FIG. 4, guide carriages 32 which can be shifted in the y-direction and are fastened to the second plane 24 in the assembled state are provided on the guide rails 30 of the y-axis guide 34. As a result of the design described, the fastening part 20, or the second plane 24 according to the arrow 25 in FIG. 3 in the x-direction and according to the arrow 27 in the y-direction, can be moved from a basic position to a compensating position. The movement in the x-direction takes place by shifting the first plane 22 relative to the main part 18 and the shift in the x-direction takes place by shifting the second plane 24 relative to the first plane 22.

Figure 5:
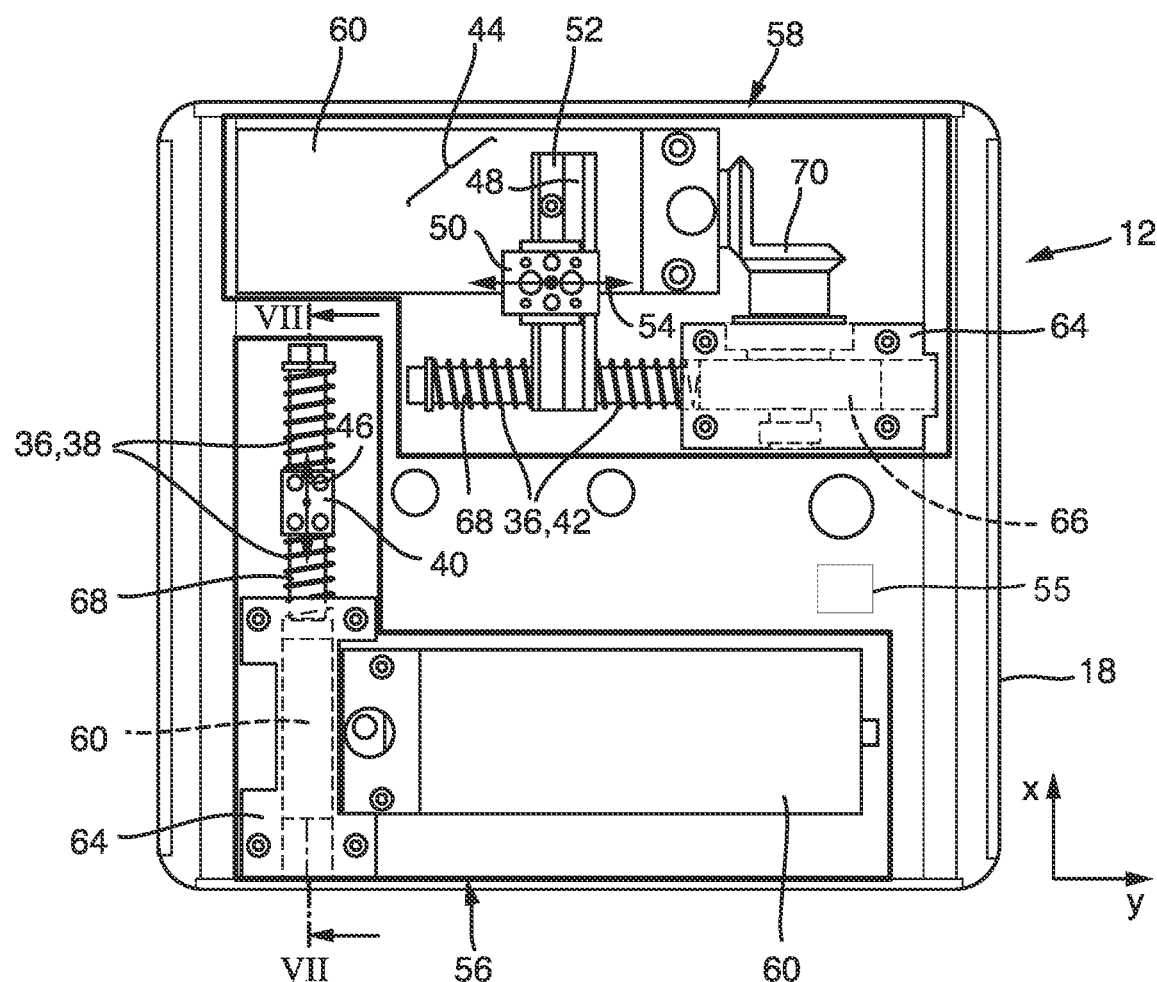
FIG. 5 shows the plan view of the main part of the compensating unit according to FIG. 4 without a fastening part and a locking unit.

Spring means 36, which can be clearly seen in FIG. 5, are provided to cause the fastening part 20, or the two planes 22, 24, to return from the compensating position to the basic position. The spring means 36 comprise a first pair of coil springs 38 which interacts with the first plane 22 via an adapter 40. The spring means 36 also comprise a second pair of coil springs 42 which interacts with the second plane 24 via a second adapter 44. The adapters 40, 44 are each held between the pairs of coil springs 38, 42 under preloading, with it being possible for said adapters to be moved in the x-direction or y-direction when the respective spring force is exceeded.

The adapter 40 is therefore spring-loaded along the double arrow 46, as shown in FIG. 5, but can be slid in the x-direction.

Figure 6:
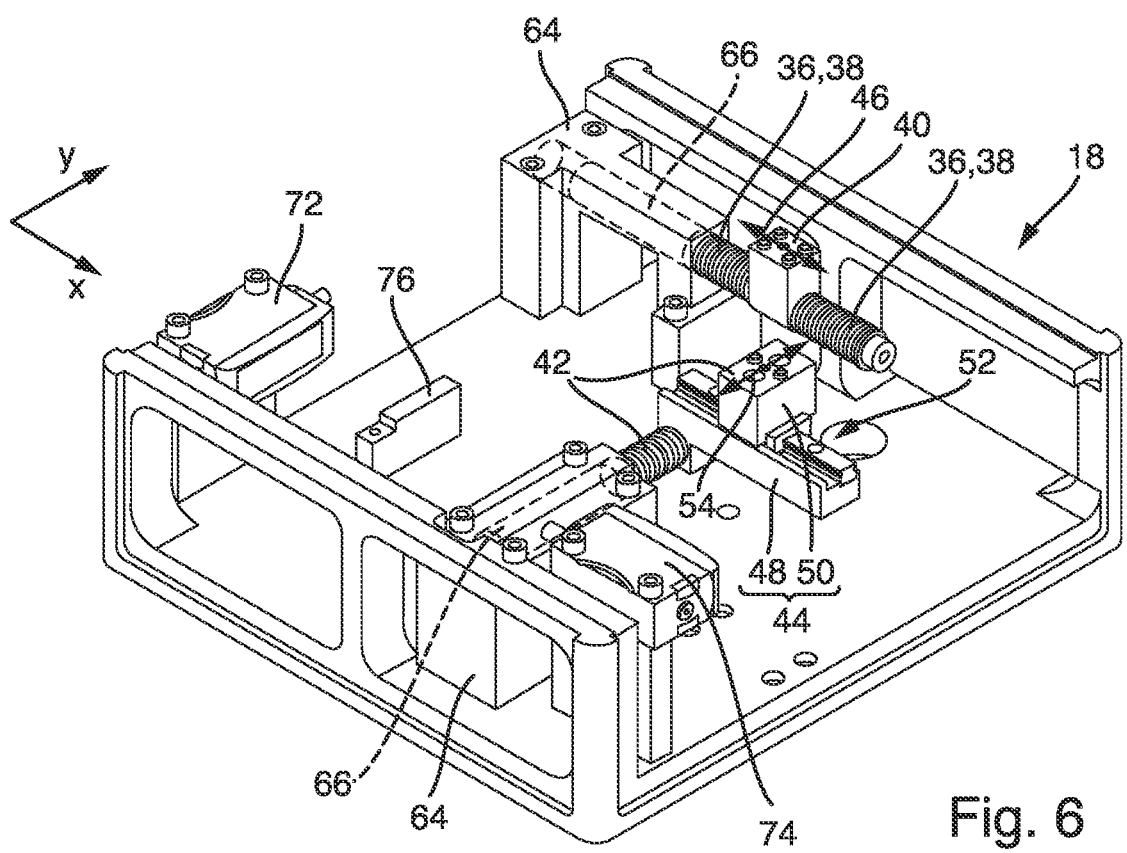
FIG. 6 shows the main part according to FIG. 5 without drives having position sensors.
Figure 7:
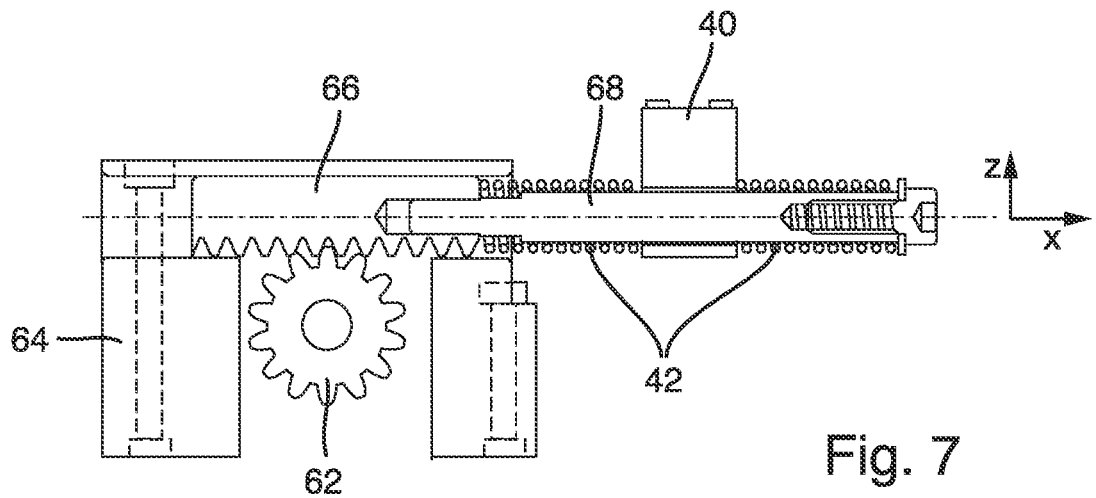
FIG. 7 shows a longitudinal sectional view along the line VII in FIG. 5.

As is particularly clear from FIGS. 5 and 6, the adapter 44 comprises a first adapter part 48 which is mounted so as to be displaceable in the y-direction and is acted upon by the coil springs 44, and a second adapter part 50 which is mounted so as to be freely displaceable in the x-direction on the first adapter part 48 by means of an adapter guide 52. The second adapter part 50 can move the second plane 24 in the x-direction without interference. In the y-direction, on the other hand, the first adapter part 48, and also the second adapter part 50, is spring-loaded in the basic position due to the coil springs 42 but is arranged displaceably in the y-direction. If the fastening part 20 or the second plane 24 is subjected to a force in the y-direction that is greater than the spring force of the coil springs 22, the adapter 44, or the two adapter parts 48, 50, can be moved along the double arrow 54 in the y-direction from the basic position to a compensating position.

As is also clear from FIGS. 4 and 5 in particular, the compensating unit 12 has two drive means 56, 58 which can be controlled by a control unit 55, it being possible for the position of the adapter 40 to be shifted in the x-direction by means of the first drive means 56 so that ultimately the basic position of the first plane 22 and the second plane 24, and thus also the basic position of the fastening part 20, can be shifted in the x-direction. The drive means 58 are also arranged in such a way that they can be used to adjust the position of the adapter 44 in the y-direction, and thus the basic position of the second plane 24 or the fastening part 20 in the y-direction. For the sake of clarity, only the two drive means 56 and 58 having the adapters 40 and 44 are shown in FIG. 5; further components in the main part 18 are not shown.

The drive means 56 and 58 each comprise a drive 60 in the form of an electric motor, the drives 60 each driving a pinion 62 which is arranged so as to be rotatably mounted in a respective pinion housing 64. In the sectional view according to FIG. 7, the pinion 62 of the first drive means 56 can be clearly seen. The pinion 62 engages with a positioning element 66 in the form of a rack guided in the pinion housing 64 in the x-direction, a shaft portion 68 being arranged on the positioning element 66, on which shaft portion the adapter 40 is arranged so as to be freely displaceable in the x-direction by means of a sliding guide. In the sectional view according to FIG. 7, the coil springs 42 can also be clearly seen, each of which is supported on the adapter 40 at one end and acts against a stop provided on the shaft portion 68 at the other end in each case. As already described, the adapter 40 can swerve in the x-direction when subjected to a force that is greater than the preloading force of the coil springs 42. By activating the drive 60 or turning the pinion 62, the basic position of the adapter 40 and thus of the fastening part 20 can be adjusted in the x-direction.

The drive means 58, which are provided for the purpose of adjusting the adapter 44 in the y-direction, correspond in structure to the drive means 56. A positioning element 66 in the form of a rack having a shaft portion 68 is accordingly mounted in the pinion housing 64 of the drive means 58. In contrast to the drive means 56, the drive 60 in the drive means 58 is driven in rotation via a bevel gear mechanism 70 with the associated pinion 22. This has the advantage that the two drives 60, as is clear from FIG. 5, can be arranged in parallel with one another in the main part 18 in a space-saving manner. The two positioning elements 66, or the racks having the shaft portions 68, form a right angle, as is also clear from FIG. 5.

For the sake of clarity, the drives 60 and the associated pinions 62 are not shown in FIG. 6. However, FIG. 6 shows two optical position sensors 72 and 74, it being possible for the distance from a reflector element 76 arranged on the first plane 22, and thus the respective position of the fastening part 20 in the x-direction, to be determined by means of the position sensor 72. The reflector element 76 can also be seen clearly in FIG. 4. The distance from the first adapter part 48 in the y-direction is determined by means of the position sensor 74, as a result of which the respective position of the fastening part 20 in the y-direction can ultimately be detected. By providing the position sensors 72 and 74, the respective actual position (compensating position) of the fastening part 20 in the x-direction and y-direction can therefore always be determined.

The control unit 55 is set up in such a way that it can determine the basic position, which corresponds to the target position of the fastening part 20 in the x-direction and y-direction, in particular via rotary position encoders provided on the drives. From the deviation $\Delta L$ between the actual position determined by means of the position sensor 72, 74, i.e., the compensating position, and the basic position determined via the rotary position encoder, the control unit 55 can use Hooke's law, with a known spring rate c, to determine the force $F_{x,y}$ acting on the fastening part in the x-direction and y-direction as follows: $F_{x,y} = c \cdot \Delta L_{x,y}$ In order to allow for compensation in the z-direction, it is conceivable for a z-compensating module (not shown in the figures) to be provided on the main part 18, which module has drive means which can be controlled by the control unit 55 for the purpose of adjusting the basic position of the main part in the z-direction. If such a z-compensating module is provided, the control unit 55 can determine the force $F_z$ acting in the z-direction from a deviation in the z-direction $\Delta Lz$.

The control unit 55 is preferably designed in such a way that it controls the drive means 56, 58 on the basis of the forces and/or moments acting on the compensating unit 12.

By adjusting the basic position on the basis of the forces and/or moments acting on the compensating unit 12, active force regulation in particular can be made possible. If it is determined that the forces and/or moments acting on the compensating unit 12 are too high and exceed a threshold value, then the drive means 56, 58 can be accordingly controlled in order to avoid overloading and, in particular, damage. It is advantageous if the control unit 55 compensates for the forces and/or moments acting on the compensating unit 12 with a slight delay. The handling apparatus 14 having the tool 16 and the compensating unit 12 follows a preprogrammed path 90 which corresponds to the shape and/or position of the object to be machined or to be handled. A deviation in the shape and/or position of the object results in a change in the force acting on the tool 16 and the compensating unit 12. This change in force results in a positional deviation of the fastening part 20 along the compensating direction from the basic position to the compensating position. Due to the provided spring means 36, 38, 42, the actual force acting on the tool 16 can be deduced from the positional deviation by means of the position sensors 72, 72 via the spring constant c. The determined actual force is compared with the target force. From the comparison, the control unit 55 determines the changed basic position to compensate for the change in force. The control unit 55 controls the drive means 55, 58 in such a way that the basic position is changed according to the calculation while the tool 16 is making contact with the deviation. Consequently, the programmed path 90 of the handling apparatus 14 remains unchanged, whereas the path 91 of the tool 16 and the compensating unit 12 is adapted by the compensating unit 12 to the deviation of the object by means of changing the basic position. The deviation of the paths 90 and 91 therefore result from the change in position of the basic position.

This is possible, inter alia, in that the position sensors 72 and 74 as well as the drive means 56 and 58 are provided for the purpose of adjustment in the compensating unit 12. The small distance between the deviation contacted by the tool 16 and the adjustable fastening part 20 as well as the drive means 56 and 58 as well as the low inertia of the fastening part 20 in comparison with the inertia of the entire handling apparatus 14 and the low latency with respect to the intervention in the handling control are favorable dynamic properties, and therefore the active force regulation can be carried out with a short time delay and load changes in the range of the compensating position caused by deviations can be compensated for by the compensating unit 12.

Furthermore, the control unit 55 is set up in such a way that when an object is moved over it several times, deviations of the object that have already been determined after the first contact are taken into account, and therefore the basic position is adjusted beforehand for each further contact.

The main part 18 is shown in FIG. 8 without the drive means 56 and 58 and without the position sensors 72 and 74. A locking unit 78 is shown in the central region of the main part 18, which unit has a locking part 80 that can be shifted in the z-direction. The arrangement is such that the locking part can be acted upon in the z-direction against the underside of the second plane 24 so that it is fixed in its respective position by frictional locking. The axial shift of the locking part 80 can preferably take place pneumatically or magnetically.

Figure 9:
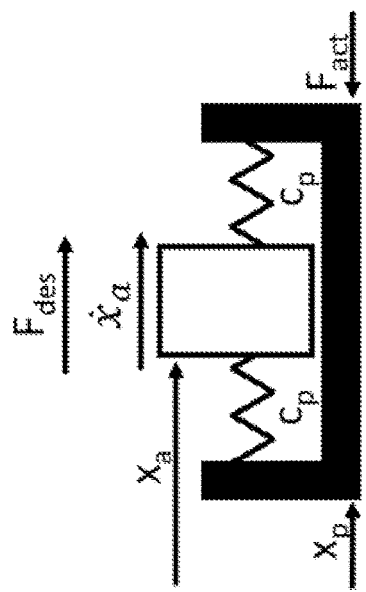
FIG. 9 shows a control structure for controlling an automation system according to the invention having a compensating unit according to the invention.
Figure 9:
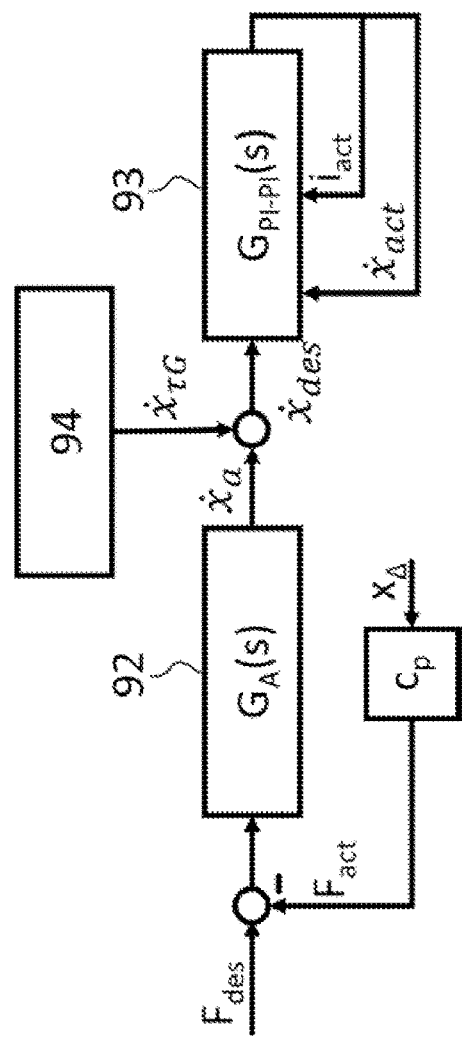

A control structure for controlling the automation system 10 by means of a force controller 92 and a servo controller 93 is shown in FIG. 9. The target force $F_{des}$ acting on the tool 16 can be set depending on the service life to be achieved for the tool 16 or the process and represents the reference variable. The true actual force $F_{act}$ can be determined from the shift of the fastening part 20 and the spring rate c of the spring means 36, 38, 42, the actual force corresponding to the control variable. The control difference from the target force $F_{des}$ and the actual force $F_{act}$ is supplied to the force controller 92. The force controller 92 determines, using the target speed $\dot{x}_a$, the positioning variable which serves as a reference variable for the servo controller 93. As a further control difference, the target speed $\dot{x}_a$ of the force controller 92 and the target speed $\dot{x}_{TG}$ of the trajectory planner 94 of the tool calculates the target speed $\dot{x}_{des}$ of the active system. The target speed $\dot{x}_{des}$ of the active system is supplied to the servo controller 93 for controlling the drive means 56, 58. Alternatively, the speed controller can also intervene on the current or position plane in the servo control structure.

Figure 10:
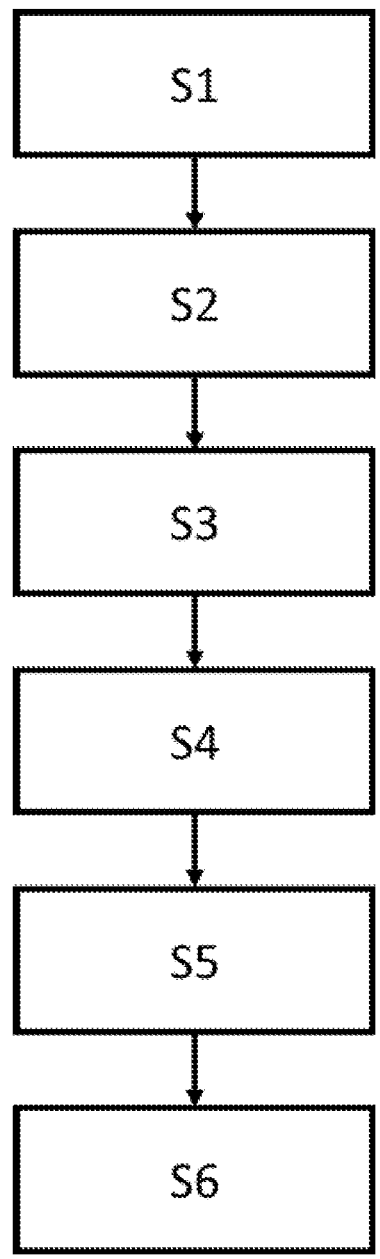
FIG. 10 shows a process diagram for the control sequence of the compensating unit according to the invention.

In addition to the control structure shown in FIG. 9, FIG. 10 shows a block diagram which shows the control sequence when contact is made with a deviation in the position or shape of a component by the tool 16. According to step S1, the coupling of the fastening part 20 to the tool 16 causes both the tool 16 and the fastening part 20 to be shifted when there is an unevenness. Due to the interaction of the fastening part 20 and the spring means 36, 38, 42, there is a relationship between the shifting of the fastening part 20 and the actual force acting on the tool 16 via the spring constant c of the spring means 36, 38, 42 in step S2. Subsequently, in step S3, the determined actual force is compared with a definable target force. The difference results, for example, in an increase in force which is transformed into a speed to be compensated for in step S4. In step S5, the speed to be compensated for is offset against the speed which corresponds to the trajectory. The target speed resulting from this is used in step S6 to control the drive means for shifting the basic position.

Figure 11:
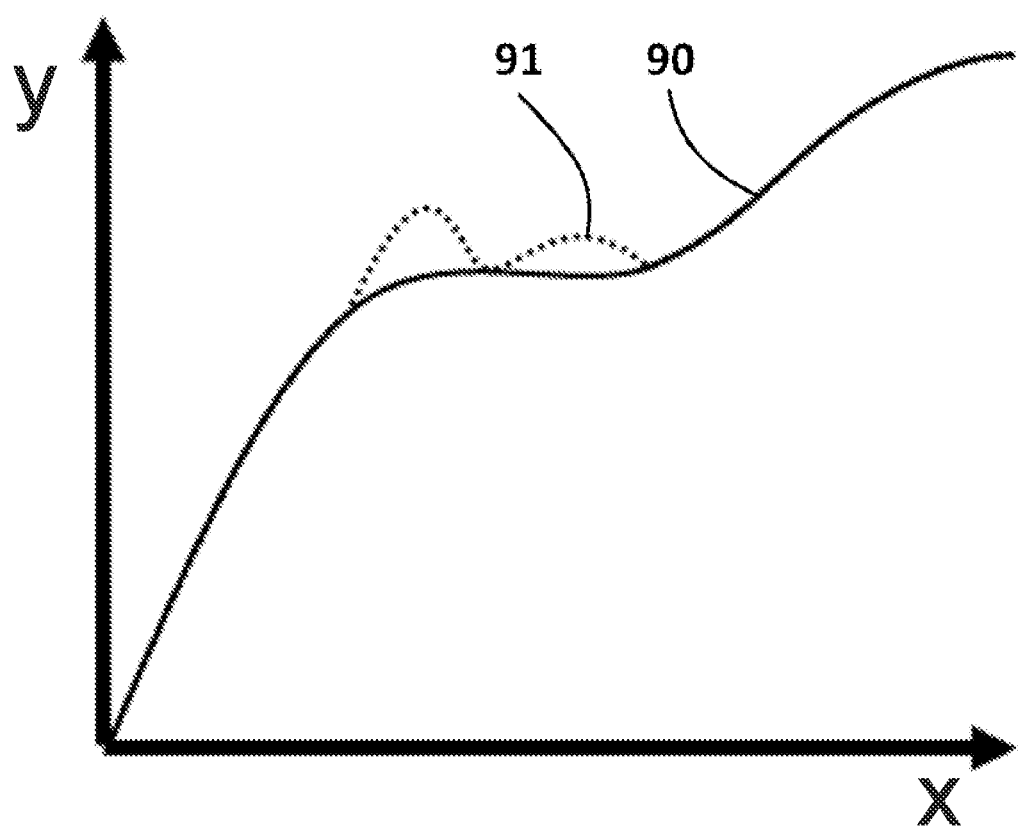
FIG. 11 shows a course of the trajectories of the tool and the handling apparatus during active regulation.

A two-dimensional coordinate system is shown in FIG. 11 for a simple illustration of the functioning of the compensating unit 12. The coordinate system can have up to 6 dimensions. In the coordinate system, a preprogrammed path 90 of the handling apparatus 14 is shown as a continuous line between the axes, which line corresponds to an object to be machined. The paths 90, 91 represent the movement of the handling apparatus 14 and the tool 16. The path 91 of the tool 16 is shown as a separate dashed line, this path 91 substantially coinciding with the path 90 of the handling apparatus 14. In addition, the path 91 of the tool 16 would correspond completely to the path 90 of the handling apparatus 14 if regulation by the compensating unit 12 is not activated. In this case, if the object deviates, an undesirable change in force occurs. The change in force is compensated for by the compensating unit 12 with active regulation. This is shown in FIG. 10 where a difference between the dashed line, path 91 of tool 16, and the solid line, path 90 of handling apparatus 14, can be seen. The two deviations result in the compensating unit 12 changing the basic position so that the path 91 of the tool 16 is adapted to the deviation of the object. Consequently, without changing the path 90 of the handling apparatus 16, there is no change in force despite deviation on the object by only the fastening part 20 and the tool 16 being adjusted in their path 91.

The invention claimed is:

1. A compensation unit for an automation system, comprising:
   a. a main part and a fastening part, the fastening part arranged such that it can be moved in relation to the main part along at least one compensating direction from a basic position into a compensating position,
   b. drive means provided within the compensating unit for the purpose of adjusting the basic position of the fastening part along the at least one compensating direction,
   c. wherein the fastening part has a first plane able to be displaced in a x-direction and a second plane able to be displaced in a y-direction,
   d. a first adapter coupled with the first plane and a second adapter coupled with the second plane, wherein the first adapter and the second adapter are each arranged between two spring elements in such a way that at least one of the first adapter and the second adapter is pushed into the basic position by the two spring elements.

2. The compensating unit according to claim 1, characterized in that a controllable locking unit for locking the fastening part relative to the main part is provided in the main part.

3. The compensating unit according to claim 1, characterized in that position sensors are provided for detecting the position of the fastening part in the respective compensating direction.

4. An automation system having a handling apparatus and a tool, wherein the compensating unit according to claim 1 is provided between the handling apparatus and the tool.

5. The compensating unit according to claim 1, characterized in that a control unit is provided for controlling the drive means on the basis of the forces and/or moments acting on the compensating unit.

6. The compensating unit according to claim 5, characterized in that the control unit is further set up in such a way that it determines the forces and/or moments acting on the compensating unit on the basis of the positional deviation of the compensating position from the basic position.

7. The compensating unit according to claim 1, characterized in that the fastening part is arranged such that it can be moved and activate the drive means along the x-direction extending perpendicularly to a z-axis of the fastening part and along the y-direction extending perpendicularly to the z-axis of the fastening part and to the x-direction.

8. The compensating unit according to claim 7, characterized in that the first plane can be moved along the x-direction when a first drive means is activated, and in that the second plane can be moved along the y-direction when a second drive means is activated.

9. The compensating unit according to claim 8, characterized in that the main part has an x-axis guide for guiding the first plane in the x-direction, and in that the first plane has a y-axis guide for guiding the second plane in the y-direction.

10. The compensating unit according to claim 8, characterized in that the first and/or the second drive means each have a drive and a positioning element and each adapter is provided on the respective positioning element in each case, and the first adapter is arranged such that it is movably guided in the x-direction and the second adapter is arranged such that is movably guided in the y-direction on the respective positioning element and the first and second adapters are arranged such that they are preloaded in the respective basic position by means of the spring elements that said first and second adapter can swerve into the respective compensating direction in order to compensate.

11. The compensating unit according to claim 8, characterized in that the first and/or the second drive means each have a drive and a positioning element and each adapter is provided on the respective positioning element in each case, and the first adapter is arranged such that it is movably guided in the x-direction and the second adapter is arranged such that is movably guided in the y-direction on the respective positioning element and the first and second adapters are arranged such that they are preloaded in the respective basic position by means of the spring elements that said first and second adapter can swerve into the respective compensating direction in order to compensate.

12. The compensating unit according to claim 11, characterized in that the first adapter of the first drive means is driven by the first drive in the x-direction and is directly movement-coupled to the first plane in the x direction.

13. The compensating unit according to claim 11, characterized in that the second adapter of the second drive means has a first adapter part which is guided in the y-direction on the positioning element and has an adapter guide extending in the x-direction, and a second adapter part which is guided so as to be freely movable in the x-direction along the adapter guide, whereby the second adapter part being movement-coupled to the second plane in the y-direction.

14. The compensating unit according to claim 11, characterized in that the positioning element of the first drive means and the positioning element of the second drive means form an angle of 90°.

15. The compensating unit according to claim 11, characterized in that the drives are designed as motors, the longitudinal axes of the two motors being arranged so as to extend in parallel with one another.

* * * * *